No. 748,981. PATENTED JAN. 5, 1904.
C. OLIVER.
APPARATUS FOR SEPARATING OIL OR GREASE FROM WATER.
APPLICATION FILED APR. 27, 1903.
NO MODEL. 2 SHEETS—SHEET 1.
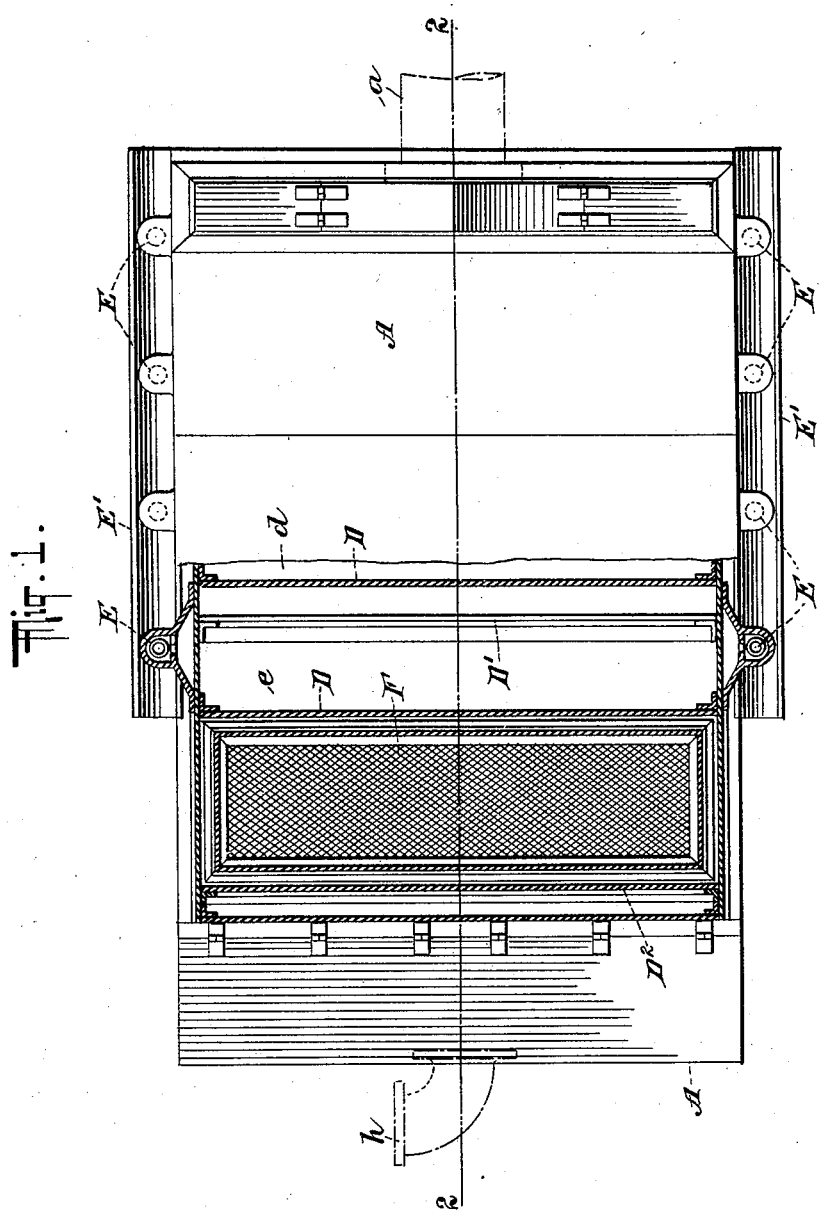
WITNESSES:
INVENTOR
Charles Oliver
BY
ATTORNEYS No. 748,981. PATENTED JAN. 5, 1904.
C. OLIVER.
APPARATUS FOR SEPARATING OIL OR GREASE FROM WATER.
APPLICATION FILED APR. 27, 1903.
NO MODEL. 2 SHEETS—SHEET 2.
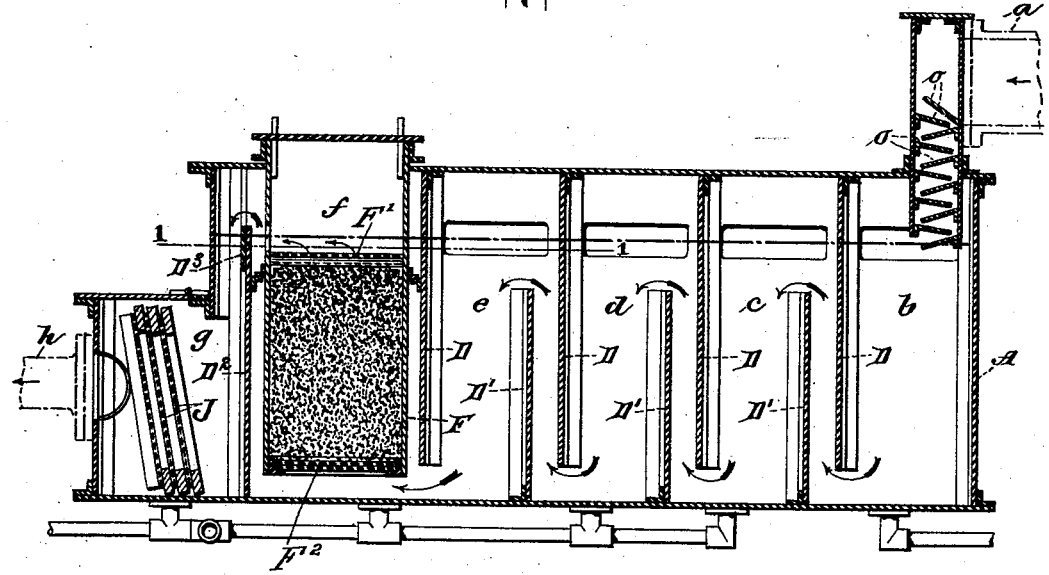
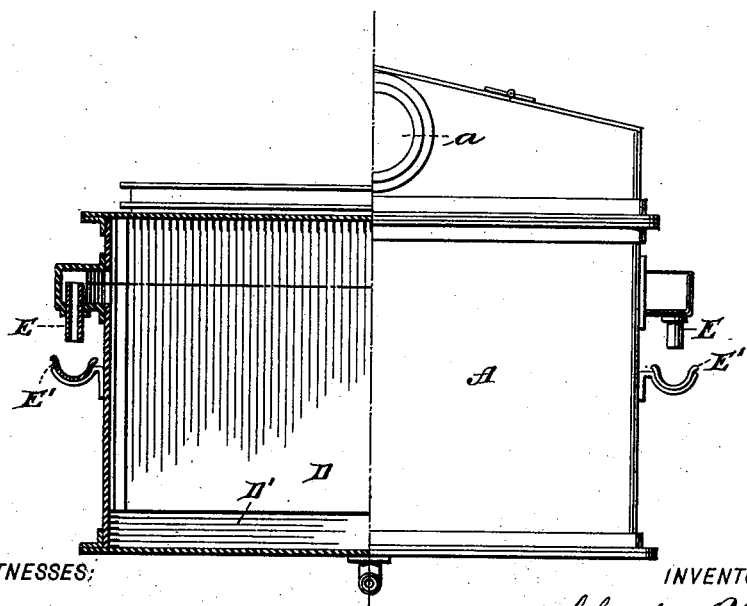

No. 748,981. Patented January 5, 1904.

UNITED STATES PATENT OFFICE.

CHARLES OLIVER, OF PENNANT HILLS, NEAR SYDNEY, NEW SOUTH WALES, AUSTRALIA.

APPARATUS FOR SEPARATING OIL OR GREASE FROM WATER.

SPECIFICATION forming part of Letters Patent No. 748,981, dated January 5, 1904.

Application filed April 27, 1903. Serial No. 154,593. (No model.)

*To all whom it may concern:*

Be it known that I, CHARLES OLIVER, a subject of the King of Great Britain and Ireland, residing at Pennant Hills, near Sydney, in the State of New South Wales, Australia, have invented certain new and useful Improvements in Apparatus for Separating Oil or Grease from Water, of which the following is a specification.

My invention relates to oil-separators and the like, and has for its object to separate oil and grease from water which has become oily or greasy from use and to effect this while the water is flowing from one receptacle to another without materially impeding the flow. To this end I provide an apparatus constructed as will be described hereinafter, it being understood, however, that the apparatus disclosed herein is but one specific form of my invention and may be modified without departing from the nature of my invention as defined by the appended claim.

Reference is to be had to the accompanying drawings, in which—

Figure 1 is a plan of the improved separator with parts in section on line 1 1 of Fig. 2. Fig. 2 is a longitudinal section on line 2 2 of Fig. 1, and Fig. 3 is an end elevation.

The apparatus comprises a casing or tank A, of approximately rectangular shape or any other suitable shape, constructed, for instance, of wood, metal, brick, or concrete. This tank is provided at one end with an inlet $a$, located at the top, and adjacent to the inlet I prefer to arrange a series of inclined plates $o\ o\ o\ o\ o\ o$ to distribute and carry the water received by a broad thin stream into the tank.

At the end of the tank opposite to the inlet $a$ is located the outlet $h$ at a level considerably below that of the inlet. Within the tank are provided a series of partitions D D', some of which, D, depend from the top of the tank and terminate short of the bottom, while others, D', extend upward from the bottom to within a distance from the top. These partitions D and D' are arranged in such manner that they form, with the side walls of the tank, an up and down tortuous passage-way, and attention is further directed to the particular arrangement (best shown in Fig. 2) whereby the upwardly-directed portions of this tortuous passage-way with respect to the direction of the flow of liquid through the tank are given a considerably smaller cross-sectional area than the downwardly-directed portions. The effect of this arrangement is to give the liquid a greater velocity when traveling upwardly than when traveling downwardly, whereby the particles of lighter liquid are given an added impetus in an upward direction, and the tendency of the downward current to carry these particles downwardly is diminished to a great extent, giving the lighter particles an opportunity and time to rise and collect. This feature is especially desirable where the difference between the specific gravities of the heavier and lighter liquids is slight. Adjacent to the outlet the last partition $D^2$, which extends up from the bottom, is continued to a higher level than the other partitions D', and this partition $D^2$ forms an overflow and governs the level of the liquid in the tank on the inlet side of said partition $D^2$. The partitions hereinbefore described subdivide the tank into a series of compartments $b\ c\ d\ e\ f\ g$, each of which communicates with the adjacent compartments, so that the liquid will follow the course indicated by the arrows—that is, the liquid will pass from the compartment $b$ under the first partition D up between said partition and the adjacent partition D' into the compartment $c$, and so from one compartment to the other until the overflow is reached at the top of the partition $D^2$. The oil or grease being lighter than water will naturally float to the top and will not follow the water in its downward movement under the lower ends of the partitions D or only to a very slight extent. The oil which collects at the top, as indicated in Fig. 3, may be removed by means of tubes E, connected with a collecting-gutter E'. In the compartment $f$, which precedes the outlet-compartment $g$, I locate a filter F, preferably removably set into the tank. This filter may contain any suitable filtering medium—as, for instance, coke. The water, with any oil or grease still remaining mixed therewith, will rise through the filter and pass over and through screens J, of coir matting, into the outlet-chamber $g$, from which the pipe $h$ conveys the water to the place where it is to be used or stored. The coir-matting screens are detachable and readily removable for cleansing.

The filter, as before stated, is removable and is fitted in a water-tight manner into its compartment, so that all the liquid passing through said compartment must rise through the filtering medium. The coke or other filtering medium is held between two screens or gratings $F'$ $F^2$. At the top of the partition $D^2$ is located an adjustable overflow-plate $D^3$, so that the level may be adjusted.

I claim as my invention and desire to secure by Letters Patent—

In a device for separating lighter liquids from heavier liquids, the combination of a vessel having an inlet and an outlet, depending and upstanding partitions between said inlet and said outlet forming an up and down tortuous passage-way, auxiliary outlets in the upper bends of said tortuous passage-way and an upstanding vertically extendible and retractable partition between said tortuous passage-way and said outlet to regulate the level of the liquid in said tortuous passage-way.

In testimony whereof I have signed my name to this specification in the presence of two subscribing witnesses.

CHARLES OLIVER.

Witnesses:
GEO. M. MOORE,
D. C. WILLIAMSON.